United States Patent [19]

Kirsch et al.

[11] Patent Number: 4,685,641

[45] Date of Patent: Aug. 11, 1987

[54] TRANSIENT AIR AND SURFACE CONTACT VEHICLE

[75] Inventors: Jerome Kirsch, Dix Hills; M. Alan Kopsco, Wantagh; Edward Markow, Oakdale; Michael Sturm, N. Massapequa, all of N.Y.

[73] Assignee: Grumman Aerospace Corporation, Bethpage, N.Y.

[21] Appl. No.: 769,241

[22] Filed: Aug. 26, 1985

Related U.S. Application Data

[63] Continuation-in-part of Ser. No. 505,808, Jun. 20, 1983, abandoned.

[51] Int. Cl.$^4$ .................. B64C 25/54; B64C 35/00
[52] U.S. Cl. .................... 244/105; 244/101; 114/272; 114/282; 114/283; 114/292
[58] Field of Search .............. 244/105, 106, 108, 50, 244/2, 101; 114/271, 282, 283, 292, 272

[56] References Cited

U.S. PATENT DOCUMENTS

| D. 259,554 | 6/1981 | Parise et al. | 244/45 A |
|---|---|---|---|
| 1,032,868 | 7/1912 | Thompson | 244/105 |
| 2,368,630 | 2/1945 | Bizjak | 244/58 |
| 2,429,992 | 11/1947 | Crispell | 244/105 |
| 2,634,067 | 4/1953 | McCoy et al. | 244/175 |
| 2,646,235 | 7/1953 | Dawson, Sr. | 244/105 |
| 4,080,922 | 3/1978 | Brubaker | 244/108 |

Primary Examiner—Joseph F. Peters, Jr.
Assistant Examiner—Rodney Corl
Attorney, Agent, or Firm—Richard G. Geib; Daniel Jay Tick; Bernard S. Hoffman

[57] ABSTRACT

A transient air and surface contact vehicle for transporting a person has a fuselage structure for carrying a person. A vehicle support extends from the structure and abuts a surface and thereby supports the vehicle at a predetermined distance above the surface. A buoyancy control device mounted on the structure and on the vehicle support provides for the buoyancy required to keep the vehicle afloat while stationary and at low speeds. At high speed the dynamic pressures generated at the bottom of the struts provide the supporting forces. A power source is mounted on the structure for moving the vehicle along the surface at the predetermined distance above the surface. A position control mounted on the structure produces a positive pitching moment to cause the vehicle to become airborne, a negative pitching moment to maintain the vehicle in surface-following contact with the surface and both moments to control the altitude of the vehicle when it is airborne. It is the pre-determined negative pitching moment that enables stable "open loop" pitch performance in the presence of high speeds and irregular surfaces.

6 Claims, 5 Drawing Figures

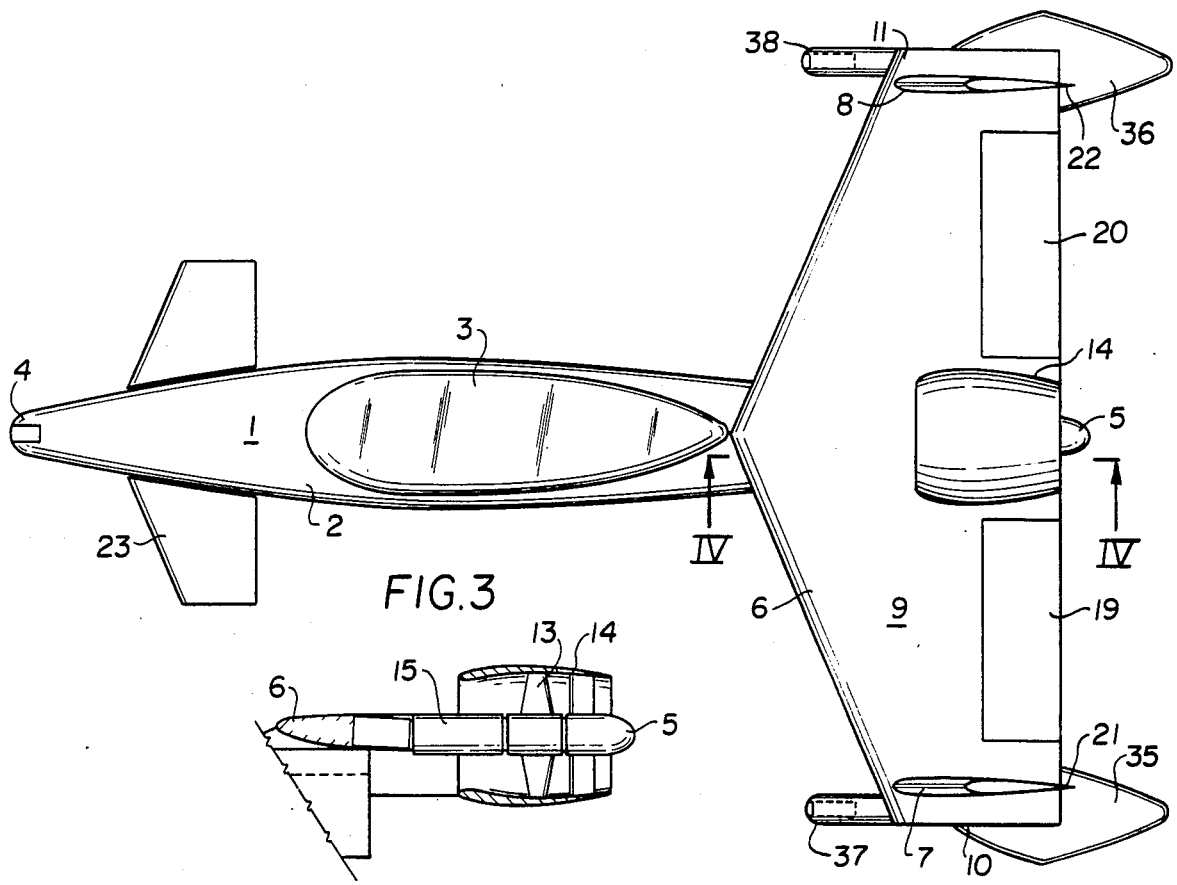
FIG.3
FIG.4
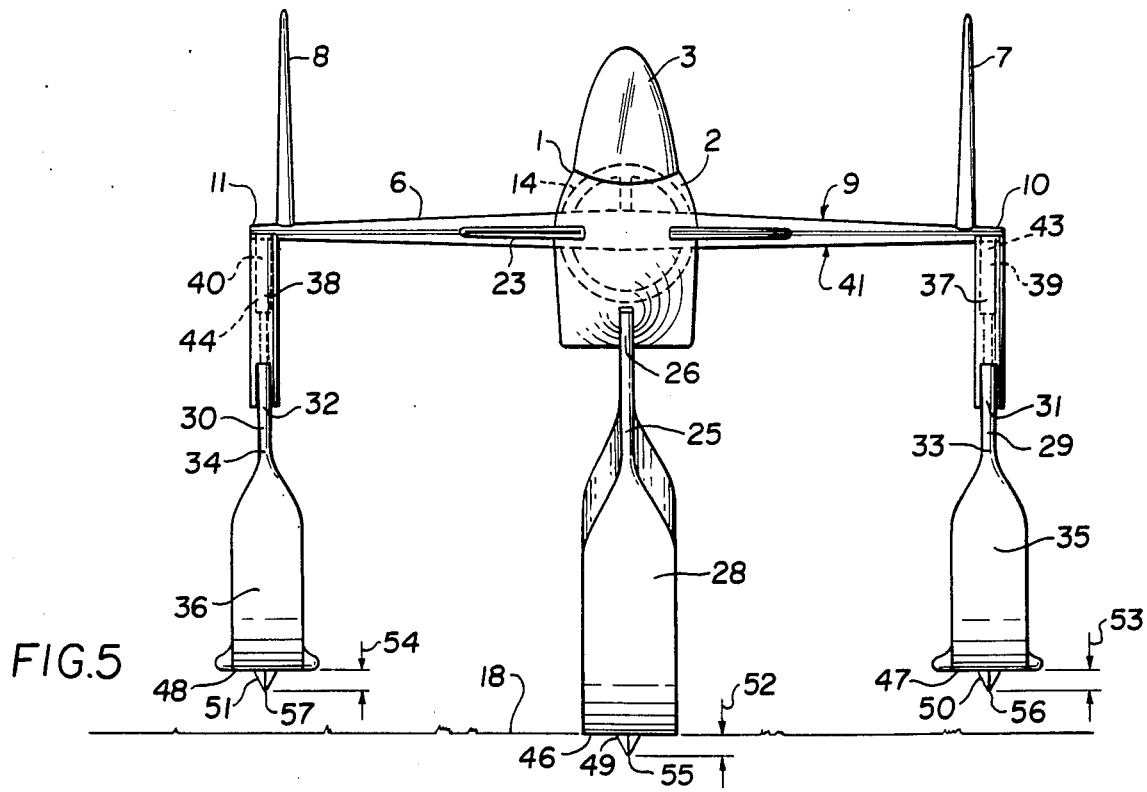
FIG.5

TRANSIENT AIR AND SURFACE CONTACT VEHICLE

BACKGROUND OF THE INVENTION

This is a continuation-in-part of application Ser. No. 505,808, filed June 20, 1983, now abandoned.

The present invention relates to a transient air and surface contact vehicle. More particularly, the invention relates to a combination aircraft and transient surface contact vehicle for transporting a person.

Known transient contact vehicles cannot move rapidly, especially over irregular surfaces and obstacles, and are unstable in irregular terrain and upon encountering obstacles.

The principal object of the invention is to provide a personal, commercial or recreational aircraft and surface contact vehicle for transporting a person in the air, on land, water, ice, mud, snow, soft sand, swamps, and the like.

An object of the invention is to provide a transient air and surface contact vehicle which transports a person at high speed over all kinds of terrain, water or in the air.

Another object of the invention is to provide a transient air and surface contact vehicle which moves at high speed over irregular terrain and obstacles, choppy water surfaces, and in the air to transport a person.

Still another object of the invention is to provide a transient air and surface contact vehicle which retains its stability in moving a person over terrain of all kinds, all kinds of water surfaces, and in the air.

Yet another object of the invention is to provide a transient air and surface contact vehicle for transporting a person and which maintains constant terrain-following contact with a surface of any type over which it moves.

Another object of the invention is to provide a transient air and surface contact vehicle of simple structure which transports a person, maintains constant terrain-following contact with a surface of land, water, or the like, over which it moves at high speed, or in the air, and retains its stability.

The locomotion performance of the vehicle of the invention represents a significant departure from conventional off-road locomotion techniques. It also profoundly increases speeds as compared to conventional vehicles. The vehicle of the invention provides impressive open-loop "ground flight" performance in the pitch plane in the presence of irregular off-road terrain and obstacles, and bodies of water.

The vehicle of the invention, designed as a personal recreational craft, represents a new transient air and surface contact vehicle class which features duplicity of aerodynamic controls usage both for airborne transportation of a person and for high speed ground and water surface transportation of a person. With modest extensions to an air vehicle configuration, in terms of equipment and cost, the virtues of both air, ground and sea vehicle classes are obtained. That is, the vehicle may provide the long ranges generically typical of air vehicles, as well as the high endurance of ground and water vehicles. Any suitable type of propulsion may be provided during ground and water movement to generate the vehicle speeds necessary for aerodynamic control effectiveness. A single "transient contact" compliant strut is utilized instead of conventional wheels to interface the surface of the ground or a body of water, or the like. Vehicular speeds of greater than 70 MPH have been demonstrated via computer simulation. These speeds are considered fast enough for a popular personal transport in the air and on the surface of a body of water.

BRIEF SUMMARY OF THE INVENTION

In accordance with the invention, a transient air and surface contact vehicle for transporting a person comprises a fuselage structure for carrying a person. The required vehicle buoyancy at zero and for low speed can be augmented with buoyancy from the structure as well, obtained from the fuselage. A power device is mounted on the structure for moving the vehicle along the surface at the predetermined distance above the surface. A position control is mounted on the structure for selectively producing a positive pitching moment to cause the vehicle to become airborne, a negative pitching moment to maintain the vehicle in surface-following contact with the surface and both moments to control the altitude of the vehicle when it is airborne.

The structure has a nose and a spaced opposite tail end, a wing mounted thereon at the tail end and fin means extending substantially perpendicularly from the surface of the wing. The position control includes wing flaperons and fin rudder means for directional and roll control during air and surface movement.

The position control further includes a canard pivotally mounted on the structure in the area of the nose thereof for pitch control during air and surface movement and to produce the positive pitching moment to cause the vehicle to become airborne and the negative pitching moment to maintain the structure in contact with the surface and prevent take-off of the structure during surface movement.

The vehicle support includes a forward strut pivotally mounted at one end at the nose of the structure and having a buoyant forward pontoon-like device at its spaced opposite end constantly abutting the surface and a pair of aft struts pivotally mounted at one end at the opposite tips of the wing and having buoyant aft pontoon-like devices at their spaced opposite ends abutting the surface.

Strut retracting devices mounted on the structure and coupled to the aft struts for retracting the aft struts to the structure. The fin means comprises a pair of fins each at a corresponding tip of the wing. Each of the struts comprises a substantially rigid tube curved at its opposite end and having a substantially teardrop shaped cross-section for reducing drag and strengthening the strut in the primary bending direction, each of the aft struts is mounted at a corresponding tip of the wing and each of the forward and aft struts is curved at its opposite end.

A plurality of resilient means, dampers and shock absorbers are mounted on the structure at each of the struts and coupled to the struts for urging the pontoon-like devices of the struts against the surface as the vehicle moves along the surface.

The forward pontoon-like device has a bottom of substantially low coefficient of friction material.

The pontoon-like devices have substantially flat bottom surfaces and are formed with longitudinally extending central projections extending substantially perpendicularly from the bottom surfaces and inclined relative to such surfaces to a maximum distance from such surfaces at the aft ends of the devices. The projections are substantially triangular in cross-section with their vertices spaced from the bottom surfaces.

In accordance with the invention, a combination aircraft and transient surface contact vehicle for transporting a person comprises an aerodynamic fuselage structure for carrying the person. A programmable navigation device mounted in the structure directs the vehicle to a preselected point via a flight path, a ground or water path, or a combination of the paths preset in the navigation device. A flight power device mounted on the structure powers the vehicle for flight in a cruise path between points programmed in the navigation device. A position control mounted in the structure cooperates with the navigation device at a preset point in the cruise path thereby permitting the vehicle to glide to a preset altitude above a surface whereby the vehicle settles onto the surface from the altitude. A buoyant vehicle support is retracted during flight and extends from the structure prior to settling onto the surface. The vehicle support abuts the surface and thereby supports the vehicle at a predetermined distance above the surface of a body of water, ground, and the like. A surface power device mounted in the structure moves the vehicle along the surface at the predetermined distance above the surface.

The structure has a nose and a spaced opposite tail end, a wing mounted thereon at the tail end and fin means extending substantially perpendicularly from the surface of the wing. The position control includes wing flaperons and fin rudder means for directional and roll control during flight and surface movement and a canard pivotally mounted on the structure in the area of the nose thereof for pitch control during air and surface movement to produce a positive pitching moment to cause the vehicle to become airborne, a negative pitching moment to maintain the vehicle in contact with the surface and both moments to control the altitude of the vehicle when it is airborne.

The vehicle support includes a forward strut pivotally mounted at one end at the nose of the structure and having a buoyant forward pontoon-like device at its spaced opposite end constantly abutting the surface and a pair of aft struts pivotally mounted at one end of the opposite tips of the wing and having buoyant aft pontoon-like devices at their spaced opposite ends abutting the surface upon settling on the surface and means for absorbing landing impact energy.

The flight power device comprises a propeller rotatably mounted on the structure at said tail end thereof, an electric or other motor mounted in the structure and coupled to the propeller to drive same and a source of electrical or other energy connected to the motor for energizing the motor. The surface power device may comprise rocket propulsion means. The fin means comprises a pair of fins each at a corresponding tip of the wing.

Strut retracting devices mounted on the structure and coupled to the aft struts for retracting the aft struts to the structure. Each of the struts comprises a substantially rigid tube curved at its opposite end and having a substantially teardrop shaped cross-section for reducing drag and strengthening the strut in the primary bending direction. Each of the aft struts is mounted at a corresponding tip of the wing and each of the forward and aft struts is curved at at its opposite end.

A plurality of resilient means, dampers and shock absorbers are mounted on the structure at each of the struts and coupled to the struts for urging the pontoon-like devices of the struts against the surface as the vehicle moves along the surface.

The forward pontoon-like device has a bottom of substantially low coefficient of friction material.

The pontoon-like devices have substantially flat bottom surfaces and are formed with longitudinally extending central projections extending substantially perpendicularly from the bottom surfaces and inclined relative to such surfaces to a maximum distance from such surfaces at the aft ends of the devices. The projections are substantially triangular in cross-section with their vertices spaced from the bottom surfaces.

BRIEF DESCRIPTION OF THE DRAWINGS

In order that the invention may be readily carried into effect, it will now be described with reference to the accompanying drawings, wherein:

FIG. 3 is a view, taken along the lines III—III, of FIG. 2;

FIG. 4 is a view, taken along the lines IV—IV, of FIG. 3: and

FIG. 5 is a view, taken along the lines V—V, of FIG. 2.

DETAILED DESCRIPTION OF PREFERRED EMBODIMENTS

The vehicle of the invention is a combination aircraft and surface-following transient vehicle 1 for carrying or transporting a person, or more than one person (not shown in the FIGS.). The vehicle 1 (FIGS. 1 to 3 and 5) comprises an aerodynamic fuselage structure 2 (FIGS. 1 to 3 and 5) carrying a person. The structure 2 has a cockpit covered by a canopy 3 (FIGS. 1 to 3 and 5).

Figure 1:
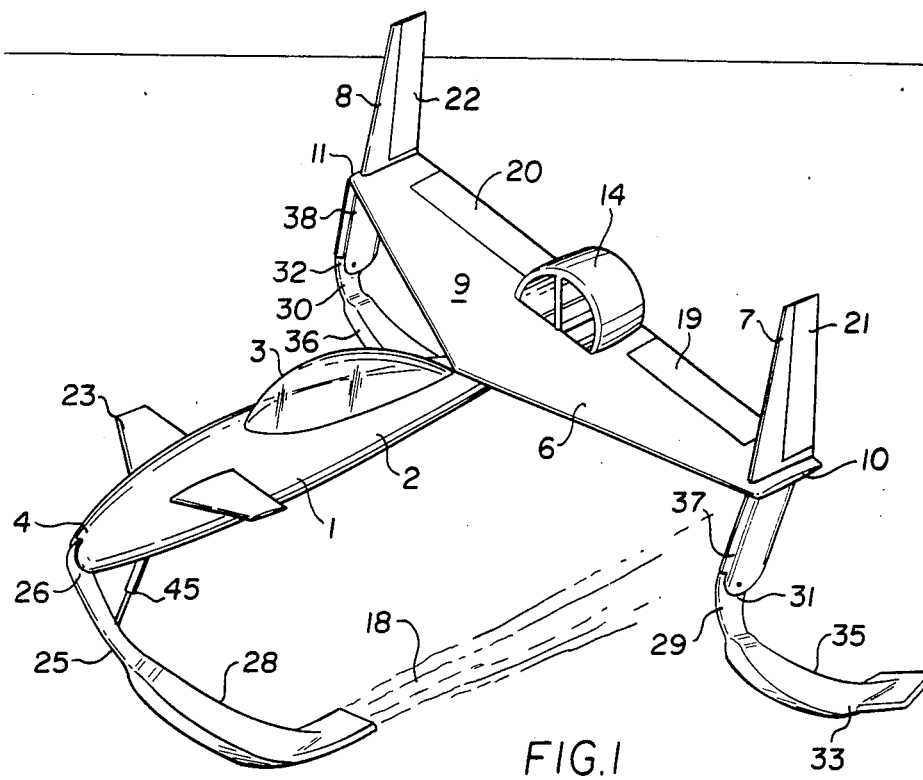
FIG. 1 is a perspective view of an embodiment of the transient air and surface contact vehicle of the invention.
Figure 2:
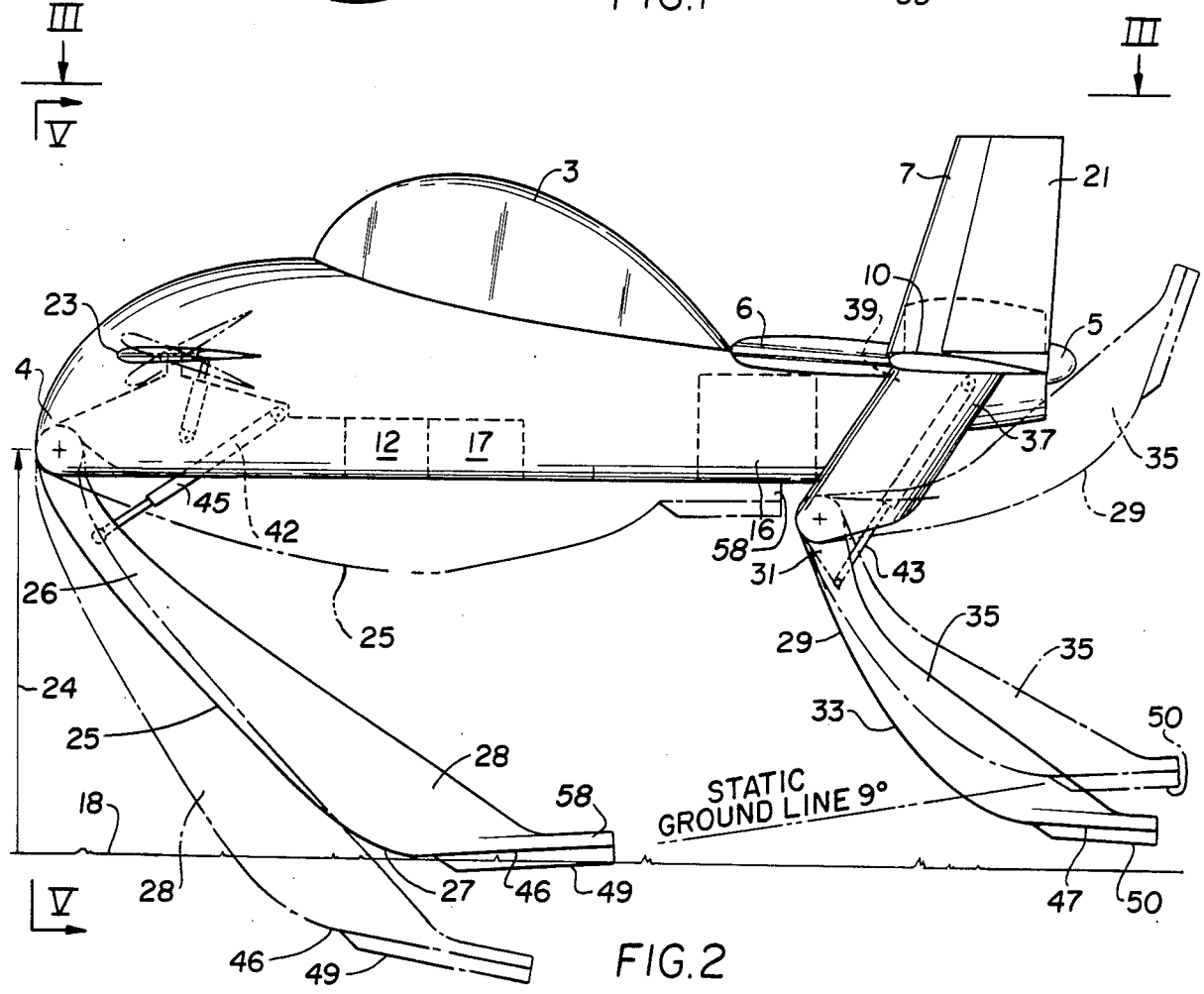
FIG. 2 is a side view, on an enlarged scale, of the embodiment of FIG. 1.

The aerodynamic structure 2 has a nose 4, as shown in FIGS. 1 to 3, and a spaced opposite tail end 5 (FIGS. 2 and 3). A wing 6 (FIGS. 1 to 5) is mounted on the structure 2 at the tail end 5 and a pair of fins 7 and 8 extend substantially perpendicularly from the upper surface 9 of said wing, each at a corresponding tip of said wing (FIGS. 1 and 5). Thus, the fin 7 extends from the surface 9 of the wing 6 at the tip 10 of said wing and the fin 8 extends from said surface of said wing at the tip 11 of said wing, as shown in FIGS. 1 and 5.

A programmable navigation device 12 (FIG. 2) of any suitable known type is mounted in the structure 2 for directing the vehicle 1 to a preselected point via a flight path, a ground or water path, or a combination of said paths preset in said navigation device.

A flight power unit is mounted on the structure 2 for powering the vehicle 1 for flight in a cruise path between points programmed in the navigation device 12. The flight power unit comprises a propeller 13 rotatably mounted in a shroud 14 on the structure 2 at the tail end 5 thereof, as shown in FIGS. 1, 3 and 4. An electric motor 15 (FIG. 4) of any suitable known type, and/or any suitable power plant such as, for example, an internal combustion engine, is mounted in the structure 2 and coupled to the propeller 13 to drive said propeller. The vehicle may be driven in the air and on the surface by the same power plant or may be driven in the air by one power plant and on the surface by another. The motor 15 is electrically connected to any suitable source of electrical energy such as, for example, a battery 16 (FIG. 2).

A position control device 17 (FIG. 2) of any suitable known type is mounted in the structure 2 and cooperates with the navigation device 12 at the preset point in the cruise path thereby permitting the vehicle 1 to glide to a preset altitude above a surface 18 whereby said vehicle settles onto said surface from said altitude. The surface 18 illustrated in FIG. 1 is that of a body of water and that shown in FIGS. 2 and 5 is ground, although it may be water, mud, snow, ice, swamp, or the like.

The position control device 17 includes wing flaperons 19 and 20 (FIGS. 1 and 3) of any suitable known type and fin rudders 21 and 22 (FIG. 1) for directional and roll control during flight and surface movement of the vehicle 1. The position control device 17 further includes a canard 23 (FIGS. 1 to 3 and 5) pivotally mounted on the structure 2 in the area of the nose 4 thereof for pitch control during air and surface movement to produce a positive pitching moment to cause the vehicle 1 to become airborne, a negative pitching moment to maintain said vehicle in contact with the surface 18 during movement of said vehicle along said surface and prevent take-off of said structure, and both moments to control the altitude of said vehicle when it is airborne.

A buoyant vehicle support is retracted during flight, as shown by broken lines in FIG. 2, and extends from the structure 2 or vehicle 1 upon settling onto the surface 18, as shown by solid lines in FIGS. 1, 2 and 5, said vehicle support abutting said surface and thereby supporting said vehicle at a predetermined distance 24 above said surface (FIG. 2). The surface 18 is that of a body of water in FIG. 1 and may be ground or water in FIG. 2. The vehicle support includes a forward strut 25 pivotally mounted at one end 26 at the nose 4 of the structure 2 (FIGS. 1, 2 and 5). The forward strut 25 has, at its spaced opposite end 27, a buoyant forward pontoon-like device 28 which constantly abuts the surface 18 (FIGS. 1, 2 and 5). The extreme forward broken line position of the forward strut, shown in FIG. 2, is its deployed no-load position.

The vehicle support further includes a pair of aft struts 29 and 30 pivotally mounted at one end 31 and 32, respectively, at the opposite tips 10 and 11, respectively, of the wing 6 (FIGS. 1 and 5). The aft struts 29 and 30 have, at their spaced opposite ends 33 and 34, respectively, buoyant aft pontoon-like devices 35 and 36, respectively, abutting the surface 18 upon settling on said surface, and contain means for absorbing landing impact energy. This is shown by solid lines in FIG. 2. The forward strut 25 and the aft struts 29 and 30 are retracted during flight, as shown by broken lines in FIG. 2. The forward broken line position of the aft struts 29 and 30, shown for the strut 29 in FIG. 2, is its static load position and the solid line position of said aft struts, shown for said struts in FIG. 2, is its no-load position.

Alternatively, the vehicle may rest with its body structure 2 nearer to the water surface by not fully extending the forward and aft struts, thereby keeping the buoyant chambers near the body. In this case, the body distance above the water would be just sufficient to permit propeller clearance. A further alternative (not shown in the FIGS.) is to provide buoyant chambers attached to the structure 2 which support it above the water surface at a distance just sufficient for propeller clearance. In this case, the struts would not include buoyant chambers, but would be extended below the water surface and lift the vehicle to its normal spaced distance above the water surface as a result of forces generated by forward velocity.

In all cases where buoyant chambers are referred to, it is understood that they are of sufficient total volume to provide buoyancy.

Strut mounts 37 and 38, respectively, including retracting mechanisms 39 and 40, respectively, as shown in FIGS. 1, 2 and 5, are mounted on the wing 6 at the tips 10 and 11, respectively, of said wing and extend substantially perpendicularly from the lower surface 41 of said wing (FIG. 5). The strut retracting mechanisms 39 and 40 are coupled to the aft struts 29 and 30, respectively, and function to selectively retract said struts to the vehicle. Each of the struts 25, 29 and 30 is curved at its opposite end 27, 33 and 34, respectively, as shown in FIGS. 1 and 2.

Each of the struts 25, 29 and 30 comprises a substantially rigid tube curved at both its ends 26 and 27, 31 and 33, 32 and 34, respectively, and having a substantially teardrop shaped cross-section for reducing drag and for strengthening the strut in the primary bending direction. Each of the struts 25, 29 and 30 has a resilient device, unit, such as, for example, a spring, damper and shock absorber 42, 43 and 44, respectively, mounted on the structure 2 at said struts and cooperating with the retracting mechanism 45 of the forward strut 25 (FIGS. 1 and 2) and with the retracting mechanisms 39 and 40 of the aft struts 29 and 30, respectively. The resilient device units 42, 43 and 44 are coupled to the corresponding struts 25, 29 and 30, respectively, for urging the pontoon-like devices 28, 35 and 36, respectively, of said struts against the surface 18 as the vehicle 1 moves along said surface. The units 42 and 43 are shown in FIG. 2 and the units 43 and 44 are shown in the FIG. 5.

The forward and aft pontoon-like devices 28, 35 and 36 have bottoms 46, 47 and 48, respectively (FIGS. 2 and 5), of substantially low coefficient of friction material of any suitable type. The bottom surfaces 46, 47 and 48 of the pontoon-like devices 28, 35 and 36, respectively are substantially flat and are formed with substantially longitudinally extending central projections 49, 50 and 51, respectively (FIG. 5), extending substantially perpendicularly from said bottom surfaces to a maximum distance 52, 53 and 54, respectively (FIG. 5). The projections 49, 50 and 51, shown in FIG. 5, are substantially triangular in cross-section with their vertices 55, 56 and 57, respectively, spaced from the bottom surfaces 46, 47 and 48, respectively (FIG. 5).

The flat bottom 46 of the forward strut is a separate plate 58 with a spring-like characteristic, which attaches to the pontoon-like device 28 such that when the forward strut is retracted, the unloaded bottom plate rotates away from the pontoon as shown in FIG. 2 to allow the pontoon to fully nest against the fuselage for minimum drag.

A surface power unit of any suitable type may be mounted on the structure 2 and functions to move the vehicle 1 along the surface 18 at the predetermined distance 24 above said surface, although the electric motor 15 and propeller 13 are adequate for such purpose.

The "large-stroke" skid or forward strut 25 and two aft struts 29 and 30 limit the impact with the ground 18 to a few g's, and lower the center of gravity for a stable landing. The vehicle 1 carries at least one person and maintains physical contact with the surface 18 at all times, that it is not airborne, via the compliant forward strut 25. Once sufficient forward velocity is achieved, the aerodynamic surfaces previously used for flight provide most of the support as well as roll, pitch and steering forces. The baseline scheme with the three struts 25, 29 and 30 for landing, and the single forward strut 25, has the general advantages of high ground clearance with low weight penalty, ability to shift from high to very low ground clearance by having the canard 23 exert aerodynamic forces that partially retract said forward strut, low drag in all phases, particularly if stowed in flight, a common control system for flight and ground control and long strokes to absorb landing impact energy.

The fundamental features of the transient air and surface contact vehicle of the invention are the aft wing 6, the aft flight power unit 13, 14, 15 16, the canard 23 for pitch control, the twin rudders 21 and 22 and flaperons 19 and 20 for directional and roll control, all controls used during both flight and surface movement and the three strut arrangement for landing.

The principal feature of the transient air and surface contact vehicle of the invention is its position control means mounted on the structure for providing pitch plane stability by trimming the vehicle as an aircraft for a pitch down moment during flight across a surface. The position control means selectively produces a negative pitching moment to maintain the vehicle in surface-following contact with the surface and a positive pitching moment to cause the vehicle to become airborne, both moments controlling the altitude of the vehicle when it is airborne.

Another feature of the vehicle specifically claimed by applicants is its forward pontoon-like device and its aft pontoon-like devices, such devices having bottoms of substantially low coefficient of friction material.

A characteristic of one particular example of the vehicle design described is having the resultant of the surface contact load closely vectored about the nominal center of gravity for a particular surface medium. In such case, the relationship of load and drag remains constant. Stability in pitch is maintained with a downward pitching moment produced by the canard. A passive relationship may be desirable between the load related deflection of the forward strut and the canard surface to enhance stability over a broader spectrum of surface features.

The vehicle 1 of the invention is configured aerodynamically such that no significant lift is contributed from the wing 6 at increased angles of attack, creating a stabilizing pitch influence. The fuselage 2 may function as one of the buoyancy chambers, and wing tip floats provide roll stability. The struts 25, 29 and 30 are lowered for "takeoff" from a flush stowed position, when the hull reaches a critical takeoff speed, to the deployed dynamic position. This eliminates the very bad drag hump before lifting free of the water and uses the vehicle momentum to help accomplish this, rather than sizing a propulsion system for this unique peak requirement.

Although the center portion of the structure 2 may house some electronics, it primarily connects forward and aft masses and houses the person or persons in the craft. This arrangement maximizes vehicle pitch moment of inertia, which is desirable in reducing response to transient surface disturbances. Conversely, it would be desirable from a weight, cost, and handling standpoint to make the structure as short as possible. The length thus ultimately depends upon the required relationship between the forward strut 25 contact point and the vehicle center of gravity.

The structure 2 shown in the FIGS. is a simple fuselage which can withstand bending and torsional loads induced by landing and control forces. A full span wing box fastens to the structure 2 to form the primary structure. Material for the primary structure will be chosen based on light weight and low cost in high-volume production. The remainder of the wing 6 and the control surfaces, which are the canard 23, the rudders 21 and 22 and the flaperons 19 and 20, are designed using advanced RPV techniques to minimize weight. It is possible to mold each major component in one operation, incorporating primary structure, aerodynamic contour and structural hard points such as, for example, engine mounts, in a single composite unit.

The vehicle 1 is steered in the air and on the ground by the twin rudders 21 and 22 mounted on top of the wing outboard of the flaperons 19 and 20. The rudders 21 and 22 operate synchronously, with throws of ±20 deg. The flaperons 19 and 20 extend from the propeller shroud 14 to each rudder 21 and 22 and have a constant chord. All motion occurs about a single hinge line, that is, no chord extension mechanism.

In the air, the vehicle 1 is propelled by the high rpm shrouded propeller 13 driven by the electric motor 15. An internal combustion engine, or other suitable engine, may be utilized as an alternative. The components are arranged so that the propeller 13 and shroud 14 are centered vertically about the wing 6 and the thrust line passes near the center of gravity.

The first task of the strut system is to absorb all of the vehicle's forward and vertical kinetic energy during the autonomous, power-off landing. During cruise, the forward centerline strut 25 and the two aft or wing tip struts 29 and 30 are pivoted back for low drag. They are deployed during the flare maneuver. Landing attitude assures that the aft struts 29 and 30 impact first, generally one before the other, and together they absorb most of the energy while traveling through their full stroke. The forward or nose strut 25 impacts slightly later and also undergoes most of its stroke.

High speed contact with a hard surface is with the pontoon-like device 28 at the tip of the forward strut 25, which has a symmetrical pointed shape to insure lateral ground resistance when traversing hard surfaces such as paved road and/or ice. The symmetry is 360° relative to the longitudinal axis. For softer surfaces such as off-road terrain, the same configuration of pontoon-like device is adequate. For mud, snow and soft sand, the pointed tip of the projection 49, 50 and 51, respectively, of the pontoon-like device 28, 35 and 36, respectively, sinks until the terrain surface contacts the larger flat bottom surface 46, 47 and 48, respectively, sufficiently for static support and high speed operation. Similar operation occurs at high speed in water and swamps, except that at low speeds, the buoyancy chambers built into all three pontoon-like devices 28, 35 and 36 support the vehicle and its operator. The cross-section of the projection 49, 50 and 51, respectively, is similar to an "ice skate" and is a viable alternative to a point formed on each pontoon-like device 28, 35 and 36.

All the struts 25, 29 and 30 have restoring springs and shock absorbers. After impact stroking, all the struts 25, 29 and 30 redeploy slowly to intermediate positions corresponding to static load. This recovery time is designed to allow forward velocity to terminate while the center of gravity is close to the ground, reducing the possibility of tip-over.

The forward strut 25 is always used as a physical reference to the surface 18, a partial vertical support, an obstacle impact absorber, and a protective bumper/skid. The structural and dynamic characteristics of the strut 25 must be optimized in terms of all of these functions, and to properly interact with the control system. The spring and damping functions of the struts may be incorporated in the strut itself by designing the strut as a series of high strength sheets, thin in the side view, separated by high hysteresis elastomer layers. This entire sandwich could be tailored to have an increasing spring rate with increasing deflection.

A preliminary 3 degree-of-freedom simulation showed profound surface or ground traverse characteristics. These stable characteristics were also obtained with a completely passive open loop system. Rather adverse, dramatic vehicle attitude changes would result if the vehicle 1 were to traverse the terrain in pure flying condition, since the lightly damped phugoid mode would be excited. For proper operation, the canard 23 is fixed at a nominal small deflection which, due to the inherent stability of the vehicle 1, produces a negative pitching moment, hence a surface reaction force. This is crucial and results in a very stable system.

The operator or person riding in the vehicle 1 is positioned as shown in FIG. 2 to reduce his or her interference with airflow across the aerodynamic control surfaces. Operation of the vehicle 1 at high speed is primarily with the forward pontoon-like device 28 in contact with the surface 18.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

We claim:

1. A transient air and surface contact vehicle for transporting a person, said vehicle comprising
    a fuselage structure for carrying a person, said structure having a nose and a spaced opposite tail end, a wing mounted thereon at said tail end and fin means extending substantially perpendicularly from the surface of said wing, said fin means comprising a pair of fins each at a corresponding tip of said wing;
    buoyant vehicle support means extending from said structure and abutting a surface and thereby supporting said vehicle at a predetermined distance above the surface of a body of water, ground, and the like, said vehicle support means including a forward strut pivotally mounted at one end at the nose of said structure and having a buoyant forward pontoon-like device at its spaced opposite end constantly abutting said surface and a pair of aft struts pivotally mounted at one end at the opposite tips of said wing and having buoyant aft pontoon-like devices at their spaced opposite ends abutting said surface, each of said struts comprising a substantially rigid tube curved at its opposite end and having a substantially teardrop shaped cross-section for reducing drag and strengthening said strut in the primary bending direction, each of said aft struts being mounted at a corresponding tip of said wing and each of said forward and aft struts being curved at its opposite end;
    power means mounted on said structure for moving said vehicle in the air and along said surface at said predetermined distance above said surface;
    position control means mounted on said structure for selectively producing a positive pitching moment to cause said vehicle to become airborne, a negative pitching moment to maintain said vehicle in surface-following contact with said surface and both moments to control the altitude of said vehicle when it is airborne, said position control means including wing flaperons and fin rudder means for directional and roll control during air and surface movement; and
    strut mounting means including retracting means mounted on said structure and coupled to said struts for selectively retracting said struts to said structure.

2. A combination aircraft and transient surface contact vehicle for transporting a person, said vehicle comprising
    an aerodynamic fuselage structure for carrying said person, said structure having a nose and a spaced opposite tail end, a wing mounted thereon at said tail end and fin means extending substantially perpendicularly from the surface of said wing;
    programmable navigation means mounted in said structure for directing said vehicle to a preselected point via a flight path, a ground or water path, or a combination of said paths preset in said navigation means;
    flight power means mounted on said structure for powering said vehicle for flight in a cruise path between points programmed in said navigation means;
    position control means mounted in said structure and cooperating with said navigation means at a preset point in said cruise path thereby permitting said vehicle to glide to a preset altitude above a surface whereby said vehicle settles onto said surface from said altitude, said position control means including wing flaperons and fin rudder means for directional and roll control during flight and surface movement and a canard pivotally mounted on said structure in the area of the nose thereof for pitch control during air and surface movement to produce a positive pitching moment to cause said vehicle to become airborne, a negative pitching moment to maintain said vehicle in contact with said surface and both moments to control the altitude of said vehicle when it is airborne;
    buoyant vehicle support means retracted during flight and extending from said structure prior to settling onto said surface, said vehicle support means abutting said surface and thereby supporting said vehicle at a predetermined distance above the surface of a body of water, ground, and the like, said vehicle support means including a forward strut pivotally mounted at one end at the nose of said structure and having a buoyant forward pontoon-like device at its spaced opposite end constantly abutting said surface and a pair of aft struts pivotally mounted at one end at the opposite tips of said wing and having buoyant aft pontoon-like devices at their spaced opposite ends abutting said surface upon settling on said surface and means for absorbing landing impact energy, each of said struts comprising a substantially rigid tube curved at its opposite end and having a substantially teardrop shaped cross-section for reducing drag and strengthening said strut in the primary bending direction, each of said aft struts being mounted at a corresponding tip of said wing and each of said forward and aft struts being curved at its opposite end;

surface power means mounted in said structure for moving said vehicle along said surface at said predetermined distance above said surface; and strut mounting means including retracting means mounted on said structure and coupled to said struts for selectively retracting said struts to said structure.

3. A combination aircraft and transient surface contact vehicle for transporting a person, said vehicle comprising an aerodynamic fuselage structure for carrying said person, said structure having a nose and a spaced opposite tail end, a wing mounted thereon at said tail end and fin means extending substantially perpendicularly from the surface of said wing;

programmable navigation means mounted in said structure for directing said vehicle to a preselected point via a flight path, a ground or water path, or a combination of said paths preset in said navigation means;

flight power means mounted on said structure for powering said vehicle for flight in a cruise path between points programmed in said navigation means;

position control means mounted in said structure and cooperating with said navigation means at a preset point in said cruise path thereby permitting said vehicle to glide to a preset altitude above a surface whereby said vehicle settles onto said surface from said altitude, said position control means including wing flaperons and fin rudder means for directional and roll control during flight and surface movement and a canard pivotally mounted on said structure in the area of the nose thereof for pitch control during air and surface movement to produce a positive pitching moment to cause said vehicle to become airborne, a negative pitching moment to maintain said vehicle in contact with said surface and both moments to control the altitude of said vehicle when it is airborne;

buoyant vehicle support means retracted during flight and extending from said structure prior to settling onto said surface, said vehicle support means abutting said surface and thereby supporting said vehicle at a predetermined distance above the surface of a body of water, ground, and the like, said vehicle support means including a forward strut pivotally mounted at one end at the nose of said structure and having a buoyant forward pontoon-like device at its spaced opposite end constantly abutting said surface and a pair of aft struts pivotally mounted at one end at the opposite tips of said wing and having buoyant aft pontoon-like devices at their spaced opposite ends abutting said surface upon settling on said surface and means for absorbing landing impact energy, said forward pontoon-like device and each of said aft pontoon-like devices having a bottom of substantially low coefficient of friction material; and surface power means mounted in said structure for moving said vehicle along said surface at said predetermined distance above said surface.

4. A transient air and surface contact vehicle for transporting a person, said vehicle comprising a fuselage structure for carrying a person, said structure having a nose and a spaced opposite tail end, a wing mounted thereon at said tail end and fin means extending substantially perpendicular from the surface of said wing, said fin means comprising a pair of fins each at a corresponding tip of said wing buoyant vehicle support means extending from said structure and abutting a surface and thereby supporting said vehicle at a predetermined distance above the surface of a body of water, ground, and the like, when said vehicle is in motion, said vehicle support means including a forward strut pivotally mounted at one end at the nose of said structure and having a buoyant forward pontoon-like device at its spaced opposite end constantly abutting said surface and a pair of aft struts pivotally mounted at one end at the opposite tips of said wing and having buoyant aft pontoon-like devices at their spaced opposite ends abutting said surface, each of said struts comprising a substantially rigid tube curved at its opposite end and having a substantially teardrop shaped cross-section for reducing drag and strengthening said strut in the primary bending direction, each of said aft struts being mounted at a corresponding tip of said wing and each of said forward and aft struts being curved at its opposite end;

power means mounted on said structure for moving said vehicle along said surface at said predetermined distance above said surface; and position control means mounted on said structure for providing pitch plane stability by trimming said vehicle as an aircraft for a pitch down moment during flight across a surface, said position control means selectively producing a negative pitching moment to maintain said vehicle in surface-following contact with said surface and a positive pitching moment to cause said vehicle to become airborne, both moments controlling the altitude of said vehicle when it is airborne, said position control means including wing flaperons and fin rudder means for directional and roll control during air and surface movement.

5. A combination aircraft and transient surface contact vehicle for transporting a person, said vehicle comprising an aerodynamic fuselage structure for carrying said person, said structure having a nose and spaced opposite tail end, a wing mounted thereon at said tail end and fin means extending substantially perpendicularly from the surface of said wing;

programmable navigation means mounted in said structure for directing said vehicle to a preselected point via a flight path, a ground or water path, or a combination of said paths preset in said navigation means;

flight power means mounted on said structure for powering said vehicle for flight in a cruise path between points programmed in said navigation means;

position control means mounted in said structure and cooperating with said navigation means at a preset point in said cruise path thereby permitting said vehicle to glide to a preset altitude above a surface whereby said vehicle settles onto said surface from said altitude, said position control means providing pitch plane stability by trimming said vehicle as an aircraft for a pitch down moment during flight across a surface, said position control means selectively producing a negative pitching moment to maintain said vehicle in surface-following contact with said surface and a positive pitching moment to cause said vehicle to become airborne, both moments controlling the altitude of said vehicle when it is airborne, said position control means including wing flaperons and fin rudder means for directional and roll control during flight and surface movement and a canard pivotally mounted on said structure in the area of the nose thereof for pitch control during air and surface movement to produce said negative and positive pitching moments;

buoyant vehicle support means retracted during flight and extending from said structure prior to settling onto said surface, said vehicle support means abutting said surface and thereby supporting said vehicle at a predetermined distance above the surface of a body of water, ground, and the like, when said vehicle is in motion, said vehicle support means including a forward strut pivotally mounted at one end at the nose of said structure and having a buoyant forward pontoon-like device at its spaced opposite end constantly abutting said surface and a pair of aft struts pivotally mounted at one end at the opposite tips of said wing and having buoyant aft pontoon-like devices at their spaced opposite ends abutting said surface upon settling on said surface and means for absorbing landing impact energy, each of said struts comprising a substantially rigid tube curved at its opposite end and having a substantially teardrop shaped cross-section for reducing drag and strengthening said strut in the primary bending direction, each of said aft struts being mounted at a corresponding tip of said wing and each of said forward and aft struts being curved at its opposite end; and surface power means mounted in said structure for moving said vehicle along said surface at said predetermined distance above said surface.

6. A transient air and surface contact vehicle for transporting a person, said vehicle comprising a fuselage structure for carrying a person, said structure having a nose and a spaced opposite tail end, a wing mounted thereon at said tail end and fin means extending substantially perpendicularly from the surface of said wing, said fin means comprising a pair of fins each at a corresponding tip of said wing;

buoyant vehicle support means extending from said structure and abutting a surface and thereby supporting said vehicle at a predetermined distance above the surface of a body of water, ground, and the like, when said vehicle is in motion, said vehicle support means including a forward strut pivotally mounted at one end at the nose of said structure and having a buoyant forward pontoon-like device at its spaced opposite end constantly abutting said surface and a pair of aft struts pivotally mounted at one end at the opposite tips of said wing and having buoyant aft pontoon-like devices at their spaced opposite ends abutting said surface, said forward pontoon-like device and each of said aft pontoon-like devices having a bottom of substantially low coefficient of friction material, each of said struts comprising a substantially rigid tube curved at its opposite end and having a substantially teardrop shaped cross-section for reducing drag and strengthening said strut in the primary bending direction, each of said aft struts being mounted at a corresponding tip of said wing and each of said forward and aft struts being curved at its opposite end;

power means mounted on said structure for moving said vehicle along said surface at said predetermined distance above said surface;

position control means mounted on said structure for providing pitch plane stability by trimming said vehicle as an aircraft for a pitch down moment during flight across a surface, said position control means selectively producing a negative pitching moment to maintain said vehicle in surface-following contact with said surface and a positive pitching moment to cause said vehicle to become airborne, both moments controlling the altitude of said vehicle when it is airborne, said position control means including wing flaperons and fin rudder means for directional and roll control during air and surface movement; and strut mounting means including retracting means mounted on said structure and coupled to said aft struts for selectively retracting said aft struts to said structure.

* * * * *